Sept. 5, 1967      W. E. PERKINS      3,340,141

BELT FOR SUCTION BOX OF A PAPER MACHINE

Filed Oct. 14, 1963

INVENTOR.
WILDER E. PERKINS

BY *James and Franklin*

ATTORNEYS

United States Patent Office 3,340,141
Patented Sept. 5, 1967

3,340,141
BELT FOR SUCTION BOX OF A
PAPER MACHINE
Wilder E. Perkins, Nutley, N.J., assignor to Raybestos-Manhattan, Inc., Passaic, N.J., a corporation of New Jersey
Filed Oct. 14, 1963, Ser. No. 315,941
5 Claims. (Cl. 162—367)

This invention relates to Fourdrinier type machines for the manufacture of paper, and more particularly to a belt for use between the wire screen and a suction box therebeneath.

Fourdrinier machines employ a travelling wire screen which travels over a suction box for the removal of water. In order to reduce wear of the screen an endless rubber belt may be disposed between the screen and the suction box. In one form the rubber belt is long and runs on suitable guide rollers, the belt having a transversely grooved top surface with perforations through the belt for free passage of water from the grooves to the suction box. For convenience the belt may be called a suction belt.

In machines intended to be sold at lower cost the suction belt has been reduced in length to the point where it may be only say seven to ten feet in doubled or endless length, despite a width of say twenty or twenty-five feet, and the rollers have been replaced by stationary curved guides or nose pieces. The belt is driven by the screen which rests thereon. Because the belt is so short it is difficult to guide, and edge guides or blocks are used which rub against the edges of the belt when the wire screen weaves or shifts in its tracking.

These rubber belts curl somewhat at the edges because there is a heavier body of rubber on the outside of the multilayer fabric carcass than there is on the inside or back of the belt. Rubber shrinkage on cooling after vulcanization causes the heavy or top side of the belt to shrink more than the back, thus causing a curl. Grooving the belt on the top or thick rubber side relieves the tension and nullifies the tendency of the belt to curl where it is grooved. As the grooves do not run to the extreme edge, in many cases these belts curl on the edges.

With short belts and edge guides or blocks, the curling is aggravated by the belt rubbing against the edge guides. Such rubbing causes the edges of the belt to curl and crack, and then to tear, with consequent need to replace the belt.

The back of the belt is lubricated with water as it slides over the end nose pieces, but nevertheless, there is considerable friction, with consequent power loss, and excessive wear at the back.

Still another difficulty is that the belt takes a sharp curve at the ends or nose pieces, the latter sometimes having a diameter of only six inches, although in other cases it may be as much as eleven or even fourteen inches, but even this constitutes a sharp bend, keeping in mind that the belt may have a width of say twenty or twenty-five feet, and a thickness of say ⅝ inch. High stresses are set up in the top surface and in these thick edges, which soon crack through with the repeated flexing. The rubber compound used for the top of the belt is an abrasion resistant rubber which must withstand the abrasion caused by the water containing some pulp which is handled at a relatively high temperature of say 140° to 160° F. This pulp and water rushes along the belt grooves and through the holes in the belt and suction box cover into the suction box. There is necessarily some slippage or creepage between the wire screen and the rubber belt driven thereby, which again leads to the need for an abrasion resistant rubber. The latter, however, is susceptible to cracking and breakage from the repeated flexing at the ends.

The primary object of the present invention is to generally improve suction belts of the type described. A more particular object is to overcome the disadvantages and difficulties pointed out above.

The invention is also applicable to longer belts which pass around end rolls instead of curved nose pieces. Such belts have the same problem, but in less degree.

To accomplish the foregoing general objects, and other more specific objects which will hereinafter appear, my invention resides in the suction belt elements and their relation one to another as are hereinafter more particularly described in the following specification. The specification is accompanied by a drawing in which.

Figure 1:
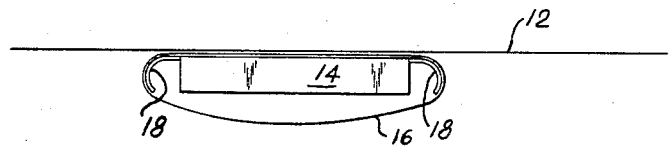
FIG. 1 is a schematic elevation showing the location of the suction belt between a wire screen and a suction box.

Referring to the drawing, and more particularly to FIG. 1, a small portion of the endless wire screen of a typical Fourdrinier type paper making machine is shown at 12. This passes over a suction box 14. To reduce abrasion and wear of the wire screen the upper pass of an endless rubber belt 16 is disposed between screen 12 and the suction box 14. The belt is perforated to facilitate extraction of water from the pulp on the screen 12. These perforations match holes or slots in the suction box cover. The belt passes around stationary curved metal guides or nose pieces 18 at the ends of the suction box 14, or on longer installations around rolls which are substituted for the curved metal guides or nose pieces 18.

The belt may be quite short, say seven to ten feet in doubled or endless length for small units, and up to twenty-five feet in endless length for large units, even though the wire screen 12, and consequently the belt 16, may have a substantial width of say twenty or twenty-five feet. The nose pieces 18 may bend the belt 16 on a small diameter, say from six to fourteen inches. End rolls on large units would be approximately 22 inches in diameter. Side guides or blocks, not shown, are provided at the suction box 14 to limit the sideward movement of the belt 16, it being understood that the belt 16 is at least a few inchees wider than the wire screen, thereby protecting the edges of the latter.

This construction results in certain disadvantages and difficulties which have been pointed out above, namely rapid wear, curling and cracking at the side edges which in turn leads to tearing of the belt, and power loss in driving the suction belt with consequent increased creepage between the screen and the suction belt, which in turn increases the wear of the screen.

Figure 2:
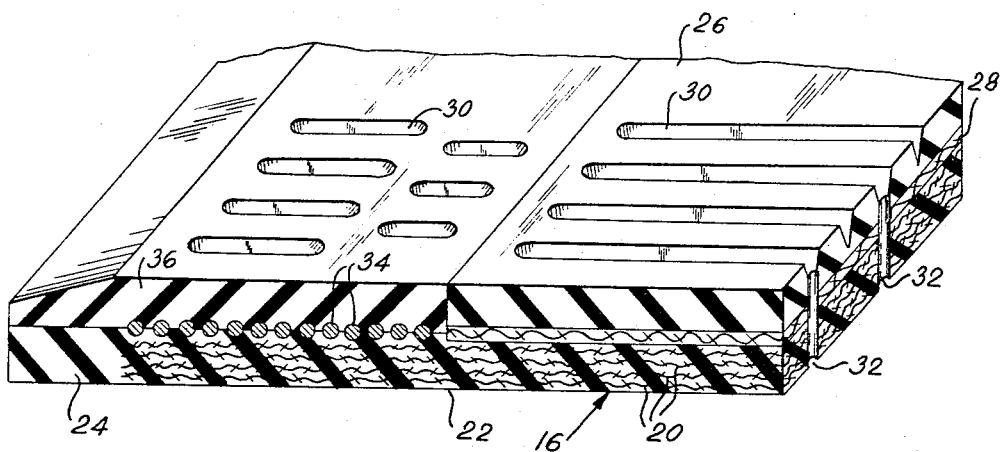
FIG. 2 is a perspective view showing a fragment of the improved belt near one edge thereof.

To overcome these difficulties I have improved the construction of the suction belt 16. Referring to FIG. 2, the particular carcass here shown comprises four plies of fabric 20. These are preferably made in known fashion of cotton wire, the warp threads being cotton, and the woof threads being wire. There is a rubber back 22, and rubber side edges 24. There is also a rubber top 26, with a "leno woven" breaker strip 28 therebetween, the "leno woven" breaker strip being sometimes called "Cider Cloth." Leno woven material is a very open weave with interlocking loops or mesh and is used in the rubber industry for securely bonding rubbers covers to carcasses of conveyor belting by permitting extra large rubber connection or "legs" to flow through this open weave fabric, thereby enhancing the bond. The rubber top 26 is much thicker than the back 22, and is made of a rubber compound selected for good resistance to heat and abrasion.

The thick top has transverse grooves 30 with appropriate perforations 32 passing through the belt at suitable intervals and in suitable staggered location, for free passage of water from the wire screen resting on top of the belt.

In accordance with one feature of my invention, the leno breaker strip or fabric 28 is replaced at each side edge of the belt by a cord fabric, indicated at 34, the cords extending lengthwise, that is, in the direction of travel of the belt. The cord fabric is preferably selected to have a thickness the same as that of the leno breaker fabric 28. In place of a woven cord fabric a single continuous spirally wound cord of proper diameter and strength may be used if desired. It is almost impossible to tear the cord fabric in transverse direction. The use of cord at the side edges enormously increases the strength or resistance of the belt to transverse tearing from the edge inward. The cord fabric (or single strand continuously wound cord) may have a width of say 1½ or 2 inches or more.

To further prevent transverse tearing I have found it desirable to inhibit the start of cracks at the side edges, and for this purpose, the side edge portions of the rubber top over the cord fabric 34 (or single strand continuously wound cord) is made of a highly flexible, crack-resistant rubber, this being indicated at 36. The use of this relatively soft, flexible rubber at the side edges is to be contrasted with the harder, abrasion-resistant rubber 26 over almost all of the top of the belt. The abrasion-resistant rubber is used in order to withstand wear caused by the water and solid particles passing through the screen from the pulp, and also caused by creepage of the wire screen itself. Because the suction belt 16 is made at least a few inches wider than the screen, and the pulp on the screen is kept a few inches back from the edges of the screen, I find that the need for abrasion-resistance is minimized at the edges, and it is thus possible to employ the desired highly flexible and crack-resistant rubber 36, without subjecting the latter to excessive wear.

Still another feature of the present invention is that the rubber back 22 and the side edges 24 are made of a rubber compound which is heavily loaded with anti-friction material. In the simplest form, I prefer to employ a heavy loading of graphite in the rubber.

The use of an anti-friction compound in the back 22 has the advantage of easier sliding on the curved nose pieces 18 (FIG. 1), which not only reduces wear, and the power required, but also reduces the creepage between the wire 12 and the suction belt 16. The anti-friction compound at the side edges 24 facilitates sliding between the side guides or blocks, and minimizes any tendency to curl and/or crack caused by friction at the side edges. The highly flexible and crack-resistant rubber at 36 minimizes initial cracking, which in turn minimizes the inception of transverse tears. In the event of any tendency to tear the belt is further protected by the cord fabric strips 34 (or single strand continuously wound cord) at the side edges.

If desired, the entire leno breaker fabric 28 may be replaced by cord fabric, or single strand continuously wound cord, but that increases the cost of the belt, and it is in the interest of economy that I employ only narrow strips of continuously wound cord or cord fabric, which I have found adequate for the present purpose. The cord strips may have a width of only one-and-one-half or two inches at each edge. The flexible rubber top at the edges 36 may have a width of say two or three inches at each edge.

The pulp on the wire screen stops a few inches short of the edges of the wire screen, in addition to the latter stopping one or several inches from the edge of the suction belt. It is for this reason that the highly flexible rubber at 36 need not be as abrasion-resistant as the main top of the belt.

Figure 3:
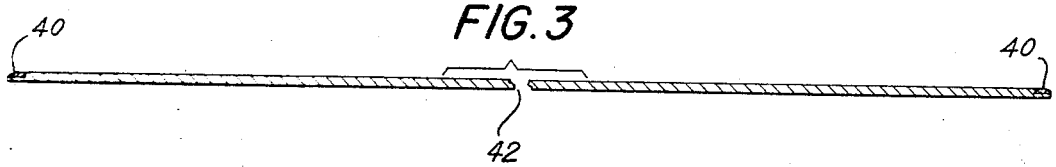
FIG. 3 is a transverse section through the belt.

Referring now to FIG. 3, this is intended merely to emphasize the fact that the entire showing of FIG. 2 is localized at the very edges of the belt, as indicated at 40. Even when drawn to this smaller scale, the middle of the belt is shown broken away at 42, it being understood that FIG. 2 represents only a few inches at the side edge of the belt, and that the full width of the belt may be say twenty or twenty-five feet.

It will be understood that various elements of the belt, such as cord, cord fabric, leno breaker ply, and so on, are suitably treated and/or impregnated and/or coated with rubber to be securely bonded to the belt.

It would be possible to make a belt without a leno breaker strip, and stopping one or more top plies of cotton wire fabric short of the edge of the carcass, and inserting wound cord or cord fabric at the edges in place of this reduced ply or plies From one viewpoint the leno breaker strip may be considered to be one fabric layer of the carcass, and then the improvement, considered more broadly, is to narrow one (or more) fabric layers of the carcass at the side edges, and to there replace it with wound cord or cord fabric.

Specific formulae for the rubber compounds are not given because it is well known that rubber can be compounded for many specific qualities. Automobile inner tubes, for example, are compounded to be very flexible, crack resistant, and to be relatively impervious to air. They are not designed to be abrasion resistant and would make a very poor tread. On the other hand, an automobile tire tread stock would make a very poor inner tube. Thus rubber can be formulated for many specific purposes, such as heat resistance, low heat build-up, abrasion resistance, flexibility, non-cold flow, resilience, tear resistance, softness or hardness, and so on.

It is believed that the construction of my improved suction belt, as well as the advantage thereof, will be apparent from the foregoing detailed description. It will also be apparent that while I have shown and described the invention in a preferred form, changes may be made without departing from the scope of the invention, as sought to be defined in the following claims. The term "rubber" is intended to include natural rubber, synthetic rubber, mixtures of the two, or other elastomeric materials or rubber-like polymers which can be formulated as described above. The term "cord fabric" is intended to include a continuously wound cord, as explained above.

I claim:
1. An endless belt for use between a Fourdrinier-type wire screen and a suction box therebeneath, said belt comprising a multi-layer cotton wire fabric carcass, a rubber back and side edges, a leno breaker strip, and a rubber top made of a compound selected for good resistance to heat and abrasion, said belt having holes therethrough for passage of water, the rubber back and side edges of the belt being made of a rubber compound heavily loaded with anti-friction material, the side edge portions of the rubber top being made of a highly flexible crack-resistant rubber in order to inhibit cracking at the side edges.

2. An endless belt for use between a Fourdrinier-type wire screen and a suction box therebeneath, said belt comprising a fabric carcass, a rubber back and side edges, a leno breaker strip, and a rubber top made of a compound selected for good resistance to heat and abrasion, said belt having holes therethrough for passage of water, the rubber back and side edges of the belt being made of a rubber compound heavily loaded with graphite acting as an anti-friction material, the side edge portions of the rubber top being made of a highly flexible crack-resistant rubber in order to inhibit cracking at the side edges, and the leno breaker strip being replaced at least at its side edges by a cord fabric in order to resist tearing.

3. An endless belt for use between a Fourdrinier-type wire screen and a suction box therebeneath, said belt comprising a fabric carcass, a rubber back and side edges, a leno breaker strip, and a rubber top made of a compound selected for good resistance to heat and abrasion, said belt having channels on top and holes therethrough for passage of water, the rubber back and side edges of the belt being made of a rubber compound heavily loaded with graphite, the side edge portions of the rubber top being made of a highly flexible crack-resistant rubber in order to inhibit cracking at the side edges, the leno breaker strip being replaced at least at its side edges by a cord fabric of like thickness in order to resist tearing.

4. An endless belt for use between a Fourdrinier-type wire screen and a suction box therebeneath, said belt comprising a multi-layer cotton wire fabric carcass, a rubber back and side edges, a leno breaker strip, and a rubber top made of a compound selected for good resistance to heat and abrasion, said belt having channels on top and holes therethrough for passage of water, the rubber back and side edges of the belt being made of a rubber compound heavily loaded with graphite, the side edge portions of the rubber top being made of a highly flexible crack-resistant rubber in order to inhibit cracking at the side edges, the leno breaker strip being replaced at least at its side edges by a cord fabric of like thickness in order to resist tearing.

5. An endless belt for use between a Fourdrinier-type wire screen and a suction box therebeneath, said belt comprising a fabric carcass, a rubber back and side edges, and a rubber top made of a compound selected for good resistance to heat and abrasion, said belt having holes therethrough for passage of water, the rubber back and side edges of the belt being made of a rubber compound heavily loaded with graphite acting as an anti-friction material, the side edge portions of the rubber top being made of a highly flexible crack-resistant rubber in order to inhibit cracking at the side edges, and a fabric layer of the carcass being replaced at least at its side edges by a cord fabric in order to resist tearing.

References Cited
UNITED STATES PATENTS

| | | | |
|---|---|---|---|
| 1,952,934 | 3/1934 | Matthews | 161—89 |
| 2,309,928 | 2/1943 | Bennett | 161—96 |
| 2,630,603 | 3/1953 | Freedlander et al. | 156—137 |
| 2,951,053 | 8/1960 | Reuter et al. | |
| 3,077,925 | 2/1963 | Perkins et al. | 162—367 |

DONALL H. SYLVESTER, *Primary Examiner.*

J. H. NEWSOME, A. C. HODGSON,
*Assistant Examiners.*